(12) United States Patent
Colceri

(10) Patent No.: US 11,975,271 B2
(45) Date of Patent: May 7, 2024

(54) SYSTEM AND METHOD FOR EVENT-BASED GAMING

(71) Applicant: John Colceri, Pasadena, CA (US)

(72) Inventor: John Colceri, Pasadena, CA (US)

(73) Assignee: SMET VENTURES, LLC, Temecula, CA (US)

( * ) Notice: Subject to any disclaimer, the term of this patent is extended or adjusted under 35 U.S.C. 154(b) by 0 days.

(21) Appl. No.: 16/835,931

(22) Filed: Mar. 31, 2020

(65) Prior Publication Data

US 2021/0046387 A1 Feb. 18, 2021

Related U.S. Application Data

(63) Continuation of application No. 15/955,318, filed on Apr. 17, 2018, now abandoned.

(60) Provisional application No. 62/486,215, filed on Apr. 17, 2017.

(51) Int. Cl.
*A63F 13/828* (2014.01)
*G07F 17/32* (2006.01)
*G07F 17/42* (2006.01)
*A63F 13/65* (2014.01)

(52) U.S. Cl.
CPC ........ *A63F 13/828* (2014.09); *G07F 17/3223* (2013.01); *G07F 17/3258* (2013.01); *G07F 17/3274* (2013.01); *G07F 17/3288* (2013.01); *G07F 17/42* (2013.01); *A63F 13/65* (2014.09)

(58) Field of Classification Search
CPC .... A63F 13/65; A63F 13/828; G07F 17/3223; G07F 17/3258; G07F 17/3274; G07F 17/3288; G07F 17/42
See application file for complete search history.

(56) References Cited

U.S. PATENT DOCUMENTS

| | | |
|---|---|---|
| 5,518,239 A | 5/1996 | Johnston |
| 6,120,376 A | 9/2000 | Cherry |
| 6,193,605 B1 | 2/2001 | Libby et al. |
| 7,260,834 B1 | 8/2007 | Carlson |
| 8,182,328 B2 | 5/2012 | Odom et al. |
| 8,548,611 B2 | 10/2013 | Ahlstrom |
| 8,622,797 B2 | 1/2014 | Noonan et al. |
| 8,876,584 B2 | 11/2014 | Colceri |

(Continued)

FOREIGN PATENT DOCUMENTS

WO WO-2016191860 A1 * 12/2016 ............. A63F 13/00

*Primary Examiner* — James S. McClellan
*Assistant Examiner* — Ross A Williams
(74) *Attorney, Agent, or Firm* — Weide & Miller, Ltd.

(57) ABSTRACT

A system and method provides an event-based game to a plurality of players including displaying an event, the event having an end, generating a plurality of different pools for the event, wherein each of the different pools includes a plurality of groups and each of the groups includes a plurality of participants, determining eligible participants for each of the different pools, randomly assigning one eligible participant of the plurality of participants from one of the groups to a plurality of eligible participants of the plurality of participants from another one of the groups, allowing a player to place a wager on the event, selecting one of the eligible participants from each of the different pools, printing a ticket with the selected participants, dispensing the ticket to the player, and awarding a prize based on a highest total number of points at the end of the event.

18 Claims, 14 Drawing Sheets

(56) References Cited

U.S. PATENT DOCUMENTS

| | | |
|---|---|---|
| 9,953,489 B2 | 4/2018 | Colceri |
| 10,105,595 B2 | 10/2018 | Lempel |
| 2004/0266513 A1 | 12/2004 | Odom et al. |
| 2005/0130725 A1 | 6/2005 | Creamer et al. |
| 2005/0233794 A1 | 10/2005 | Cannon et al. |
| 2005/0288081 A1 | 12/2005 | Amaitis et al. |
| 2006/0009280 A1 | 1/2006 | Joshi et al. |
| 2006/0079312 A1 | 4/2006 | Penrice |
| 2007/0087804 A1 | 4/2007 | Knowles et al. |
| 2007/0184892 A1 | 8/2007 | Asher et al. |
| 2007/0202939 A1 | 8/2007 | Hannan et al. |
| 2008/0263626 A1* | 10/2008 | Bainter ............... H04L 41/0631 707/999.1 |
| 2011/0021262 A1 | 1/2011 | Wikander |
| 2011/0165946 A1 | 7/2011 | Pavlich et al. |
| 2011/0230243 A1 | 9/2011 | Hereford |
| 2012/0246046 A1* | 9/2012 | Hirsch ................... G06Q 40/02 705/35 |
| 2012/0295685 A1 | 11/2012 | Odom et al. |
| 2013/0079094 A1 | 3/2013 | Odom et al. |
| 2013/0281172 A1* | 10/2013 | Bridge ...................... A63F 1/00 463/11 |
| 2014/0121013 A1 | 5/2014 | Carson et al. |
| 2014/0128410 A1 | 5/2014 | Cai et al. |
| 2016/0300452 A1 | 10/2016 | Cummings |
| 2016/0310848 A1 | 10/2016 | Sirianni |
| 2017/0236364 A1 | 8/2017 | Heathcote et al. |
| 2019/0221072 A1* | 7/2019 | Litman ................ A63F 3/0665 |

\* cited by examiner

QB Pool

Group A

A. Rodgers - GB

T. Brady - NE

A. Luck - IND

R. Wilson - SEA

D. Brees - NOS

E. Manning - NYG

P. Rivers - LAC

D. Carr - OAK

M. Ryan - ATL

C. Newton - CAR

D. Prescott - DAL

M. Stafford - DET

K. Cousins - WAS

A. Dalton - CIN

B. Roethlisberger - PIT

J. Flacco – BAL

Group B

J. Winston - TBB

R. Tannehill – MIA

C. Wentz - PHL

S. Bradford - MIN

A. Smith - KCC

C. Palmer - ARZ

M. Marriota - TEN

T. Taylor – BUF

*RB Pool*

| Group A | Group B |
|---|---|
| E. Elliott - DAL | T. Gurley - LAR |
| J. Howard - CHI | J. Stewart - CAR |
| D. Murray - TEN | M. Forte - NYJ |
| J. Ajayi - MIA | L. Murray - OAK |
| L. Bell - PIT | B. Powell - NYJ |
| L. McCoy - BUF | R. Kelley - WAS |
| D. Johnson - ARZ | R. Mathews - SDG |
| L. Blount - NEP | R. Jennings – NYG |
| D. Freeman - ATL | |
| L. Miller - HOU | |
| M. Ingram - NOS | |
| F. Gore - IND | |
| M. Gordon - SDG | |
| C. Hyde - SFF | |
| I. Crowell - CLE | |
| S. Ware – KCC | |

FIG. 5

WR Pool

Group A

*J. Nelson - GBP*
*M. Evans - TBB*
*T. Hilton - IND*
*D. Baldwin - SEA*
*B. Cooks - NOS*
*J. Jones - ATL*
*G. Tate - DET*
*J. Edelman - NEP*
*M. Thomas - NOS*
*D. Adams - GBP*
*A. Robinson - JAX*
*S. Watkins – BUF*
*D. Thomas - DEN*
*T. Williams - LAC*
*A. Thielen - MIN*
*O. Beckham - NYG*

Group B
D. Hopkins - HOU
D. Bryant - DAL
D. Jackson - WAS
L. Fitzgerald - ARZ
E. Sanders - DEN
A. Cooper – OAK
M. Sanu - ATL
K. Benjamin - CAR

FIG. 6

*TE Pool*

Group A            Group B

*R. Gronkowski - NEP*   J. James - PIT
*T. Kelsey - KCC*       C. Uzomah - CIN
*G. Olsen – CAR*        B. Myers - TBB
*J. Graham - SEA*       L. Kendricks - LAR
*D. Walker - TEN*       J. Adams - NYG
*Z. Ertz - PHL*         D. Allen - IND
*A. Gates – LAC*        R. Allen - HOU
*C. Clay - BUF*         J. Amaro - TEN
*K. Rudolph - MIN*
*E. Ebron - DET*
*V. Davis - WAS*
*J. Doyle - IND*
*G. Barnidge - CLE*
*J. Witten – DAL*
*D. Pitta - BAL*
*J. Gresham - ARZ*

FIG. 7

K Pool

| Group A | Group B |
|---|---|
| M. Bryant - ATL | J. Meyers - JAX |
| J. Tucker - BAL | B. McMannis - DEN |
| A. Vinatieri - IND | N. Novak - HOU |
| S. Gostkowski - NEP | R. Succop - TEN |
| B. Walsh - SEA | C. Catanzaro - ARZ |
| C. Santos - KCC | G. Zuerlein - LAR |
| M. Prater - DET | J. Lambo - LAC |
| D. Hopkins - WAS | R. Bullock - CIN |
| M. Crosby - GBP | |
| W. Lutz - NOS | |
| D. Bailey - DAL | |
| R. Aguayo - TBB | |
| S. Janikowski - OAK | |
| C. Sturgis - PHL | |
| K. Forbath - MIN | |
| G. Gano - MIA | |

Sample Ticket - Exhibit A

- 
-     *Starter*                              Backup
- *QB – D. Brees – NOS*      QB - J. Winston – TBB
- *RB – L. Bell - PIT*           RB – M. Forte – NYJ
- *WR – O. Beckham – NYG*    WR – M. Sanu – ATL
- *TE – R. Gronkowski – NEP*   TE – C. Uzomah – CIN
- *K – J. Tucker – BAL*        K – R. Succop – TEN

- Your backup players are *only* in play if your starter does not play a minimum of one play in their game.

NFL Week 9 – November 5th – 6th, 2017

$5.00 Play

FIG. 9

- Results from NFL Week 9
- *QB – Drew Brees – 324 yards, 3 Touchdowns – 50.4 points 4$^{th}$*
- QB – Aaron Rodgers – 411 yards, 4 Touchdowns – 65.1 points 1$^{st}$
- *RB – LeVeon Bell – 211 yards, 3 Touchdowns - 39.1 points 1$^{st}$$*
- WR – Odell Beckham Jr. – 147 yards, 1 Touchdown – 20.7 points 6$^{th}$
- WR – Julio Jones – 191 yards, 3 Touchdowns – 37.1 points 1$^{st}$
- *TE – Rob Gronkowski – 174 yards, 3 Touchdowns – 35.4 points 1$^{st}$$*
- K – Justin Tucker – 3 FG (40, 39, 22 yards) 2 PAT – 11.0 points 7$^{th}$
- K - Kai Forbath – 5 FG (54, 47, 41, 32, 36) 1 PAT – 16.5 points 1$^{st}$
- *This ticket's active players are in italics.*
- Scoring System – 10 yards = 1 point, Touchdown = 6 points, 2 Point Conversion = 2 points, 1 Kicked PAT = 1 point, Field Goals = 3 points, Field Goals over 50 yards = 3.5 points. 1$^{st}$ Tiebreaker for Kickers is longest made Field Goal. 2$^{nd}$ Tiebreaker is total yards for Field Goals made.
- Final Results for Sample Ticket A – is that the ticket holder won 2 of 5 propositions, (RB and TE) resulting in a payoff of $50.00.

FIG. 10

- Sample Ticket - Exhibit B

- 
-     Starter                          Backup
- *QB – R. Wilson - SEA*     QB - T. Taylor - BUF
- *RB – D. Johnson- ARZ*     RB – R. Mathews - LAC
- *WR – J. Nelson – GBP*     WR – A. Cooper - OAK
- *TE – G. Olsen - CAR*     TE – B. Myers - TBB
- *K – A. Vinatieri - NEP*     K – N. Novak - HOU

- Your backup players are *only* in play if your starter does not play a minimum of one play in their game.
  - NFL Week 6 – October 15$^{th}$ – 16$^{th}$, 2017
    - $5.00 Play

FIG. 11

Results from NFL Week 6

- QB – T. Taylor – 179 Pass Yds, 48 Rush Yds, 2 TD, 2pt. Conv. – 36.7 Pts. – 16$^{th}$
- T. Taylor was the Backup QB from Pool B, replacing R. Wilson from Pool A, because he did not play in his game.
- QB – M. Ryan – 463 yards, 4 Touchdowns – 70.3 points 1st
- RB – D. Johnson – 167 yds, 5 Touchdowns - 46.7 points 1$^{st}$$
- WR – J. Nelson – 227 yds, 4 TD, - 46.7 1$^{st}$$
- TE – G. Olsen – 137 yards, 3 Touchdowns – 34.7 points 1$^{st}$$
- K – A. Vinatieri - 4 FG (52, 44, 39, 42 yards) 3 PAT – 15.5 points TOP – TIE $
- K – B. McManus – 5 FG (25, 37, 26, 52, 21 yards) – 15.5 points TOP - TIE
- 1$^{st}$ Tie Breaker - Longest FG – A. Vinatieri 52, B. McManus 52.
- 2$^{nd}$ Tie Breaker – Total FG Yards - A. Vinatieri 177, B. McManus 151. Vinatieri wins tiebreaker.
- Scoring System – 10 yards = 1 point, Touchdown = 6 points, 2 Point Conversion = 2 points, 1 Kicked PAT = 1 point, Field Goals = 3 points, Field Goals over 50 yards = 3.5 points. 1$^{st}$ Tiebreaker for Kickers is longest made Field Goal, 2$^{nd}$ Tiebreaker is total yards for FG made.
- Final Results for SampleTicket B – is that the ticket holder won 4 of 5 positions, (RB, WR, TE and K) resulting in a payoff of $5000.00.

FIG. 12

| Top 7 | WIN FROM | Prize |
|---|---|---|
| Highest Possible Scores Top Possible Score Jackpot | | Jackpot |
| Next 6 Highest Scores | $1,000 TO $2,000 * | $2,000 |
| | WIN FROM | |
| 297 | $5,000 TO $10,000 * | $10,000 |
| 287 | $2,500 TO $5,000 * | $5,000 |
| 277 | $1,000 TO $2,000 * | $2,000 |
| 267 | $500 TO $1,500 * | $1,500 |
| 257 | $500 TO $1,000 * | $1,000 |
| 247 | $250 TO $500 * | $500 |
| 237 | $100 | $100 |
| 227 | $10 | $10 |
| 217 | $5 | $5 |
| 207 | $3 | $3 |
| 197 | $2 | $2 |
| 77 | $250 | $250 |
| All other Total Scores ending in 7 from 7 up to 177 and 187 0, 7, 17, 27, 177, 187 | Free Play | Free Play |

FIG. 14

SYSTEM AND METHOD FOR EVENT-BASED GAMING

The present application is a continuation of U.S. patent application Ser. No. 15/955,318, filed on Apr. 17, 2018, which claims priority to and the benefit of U.S. Provisional Patent Application Ser. No. 62/486,215, filed on Apr. 17, 2017, the disclosures of which are hereby incorporated by reference in their entirety.

BACKGROUND OF THE INVENTION

1. Field of the Invention

The present invention relates to games of chance, and in particular, games of chance that base their outcomes on, among other things, the combination of chance with the participants' performances.

2. Description of the Related Art

It is known that sports betting, lottery, and casino games are some of the most popular games where people place bets or wager. They may also be legal in many states generally due to the randomness of their outcomes and due to the fact that their outcomes may not be dependent on the players' skills. Players have been wagering on the same events over and over and for many, many years, including horse racing, boxing, and basketball. Some players, game establishments, and game providers desire a refreshing change in the kinds of events they can place wagers on.

Many people are big fans of popular events, such as game shows like the AMERICAN IDOL®, beauty pageants like THE MISS AMERICA PAGEANT® or MISS UNIVERSE®, annual celebrity awards like the OSCARS® or the GRAMMYS®, and sporting events like NASCAR® in race car driving, MASTERS® in golf, and NFL® in football.

Currently, an event based game such as fantasy football is legal in many states. In fantasy football, a player picks the participants for their team and competes against all other players in a pool to try to outscore each other. For example, each week, the player's participants gain points for scoring a touchdown, gaining yardage, stopping a play with a defense, etc. Current fantasy football requires a lot of time in picking the participants and, due to the skill by the player in picking the participants, does not produce a level playing field. Further, in current fantasy football, if the player's participant gets injured, the player is out of luck because the injured participant scores no points and no alternate participant takes the place of the injured participant. In addition, social media sites do not allow skill based games. Therefore, there is a need in the art for a new event-based game such as fantasy football that is not dependent on a player's skill in picking participants.

SUMMARY OF THE INVENTION

The present invention provides a system for providing an event-based game to a plurality of players. The system includes a display device configured to display the event, the event having an end, and a processor in communication with the display device. The processor is configured to generate a plurality of different pools for the event, wherein each of the different pools includes a plurality of groups and each of the groups includes a plurality of participants. The system also includes a random number generator in communication with the processor. The random number generator is configured to randomly assign one eligible participant of the plurality of participants from one of the groups to a plurality of eligible participants of the plurality of participants from another one of the groups. The processor is further configured to determine eligible participants for each of the different pools, allow a player to place a wager on the event, select one of the eligible participants from each of the different pools, print a ticket with the selected participants, dispense the ticket to the player, and award a prize based on a highest total number of points at the end of the event, wherein the processor informs the player whether the player holds the highest total number of points for the event.

In another embodiment, the present invention provides a method for providing an event-based game to a plurality of players including displaying an event on a display device, the event having an end, and generating, by a processor, a plurality of different pools for the event, wherein each of the different pools includes a plurality of groups and each of the groups includes a plurality of participants. The method also includes determining, by the processor, eligible participants for each of the different pools, randomly assigning, by a random number generator, one eligible participant of the plurality of participants from one of the groups to a plurality of eligible participants of the plurality of participants from another one of the groups, and allowing, by a computing device, a player to place a wager on the event. The method further includes selecting, by the processor, one of the eligible participants from each of the different pools, printing a ticket with the selected participants, dispensing the ticket to the player, and awarding a prize based on a highest total number of points at the end of the event, wherein the processor informs the player whether the player holds the highest total number of points for the event.

In yet another embodiment, the present invention provides one or more non-transitory computer-readable storage media, having computer executable instructions embodied thereon, where when executed by at least one processor, the computer-executable instructions cause the processor to display the event, the event having an end, generate a plurality of different pools for the event, wherein each of the different pools includes a plurality of groups and each of the groups includes a plurality of participants, randomly assign one eligible participant of the plurality of participants from one of the groups to a plurality of eligible participants of the plurality of participants from another one of the groups, determine eligible participants for each of the different pools, allow a player to place a wager on the event, select one of the eligible participants from each of the different pools, print a ticket with the selected participants, dispense the ticket to the player, and award a prize based on a highest total number of points at the end of the event, wherein the processor informs the player whether the player holds the highest total number of points for the event.

One advantage of the present invention is that a new system and method is provided for an event-based game, in particular, a fantasy football game. Another advantage of the present invention is that the system and method prevents a player from choosing their participants because the participants are selected purely by chance. Yet another advantage of the present invention is that the system and method allows a player to have a level playing field for the event-based game because the player has no control over the participants and cannot choose the participants. Still another advantage of the present invention is that the system and method produces an event-based game that takes less time to play and may be used on social media sites. A further advantage of the present invention is that the system and method includes different pools of participants of the same size for the event-based game and allows regular wagering on the event-based game. Yet a further advantage of the present invention is that the system and method provides an alternate participant if the probable participant is injured at the last second.

Other advantages and features of the present invention will be readily appreciated, as the same becomes better understood, by reference to the following detailed description when considered in connection with the accompanying drawings.

BRIEF DESCRIPTION OF THE DRAWINGS

FIG. 5 is a schematic illustrating an exemplary second pool used with the system of FIG. 1.

FIG. 6 is a schematic illustrating an exemplary third pool used with the system of FIG. 1.

FIG. 7 is a schematic illustrating an exemplary fourth pool used with the system of FIG. 1.

FIG. 9 is a schematic illustrating a first sample ticket used with the system of FIG. 1.

FIG. 10 is a schematic illustrating a first week results of the event for the first sample ticket of FIG. 9 used with the system of FIG. 1.

FIG. 11 is a schematic illustrating a second sample ticket used with the system of FIG. 1.

FIG. 12 is a schematic illustrating a second week results of the event for the second sample ticket of FIG. 11 used with the system of FIG. 1.

FIG. 14 is a table of cash prizes for use with a method, according to another embodiment of the present invention, used with the system shown in FIG. 1.

Corresponding reference characters indicate corresponding components throughout the several views of the drawings.

DESCRIPTION OF THE PREFERRED EMBODIMENT(S)

Figure 1:
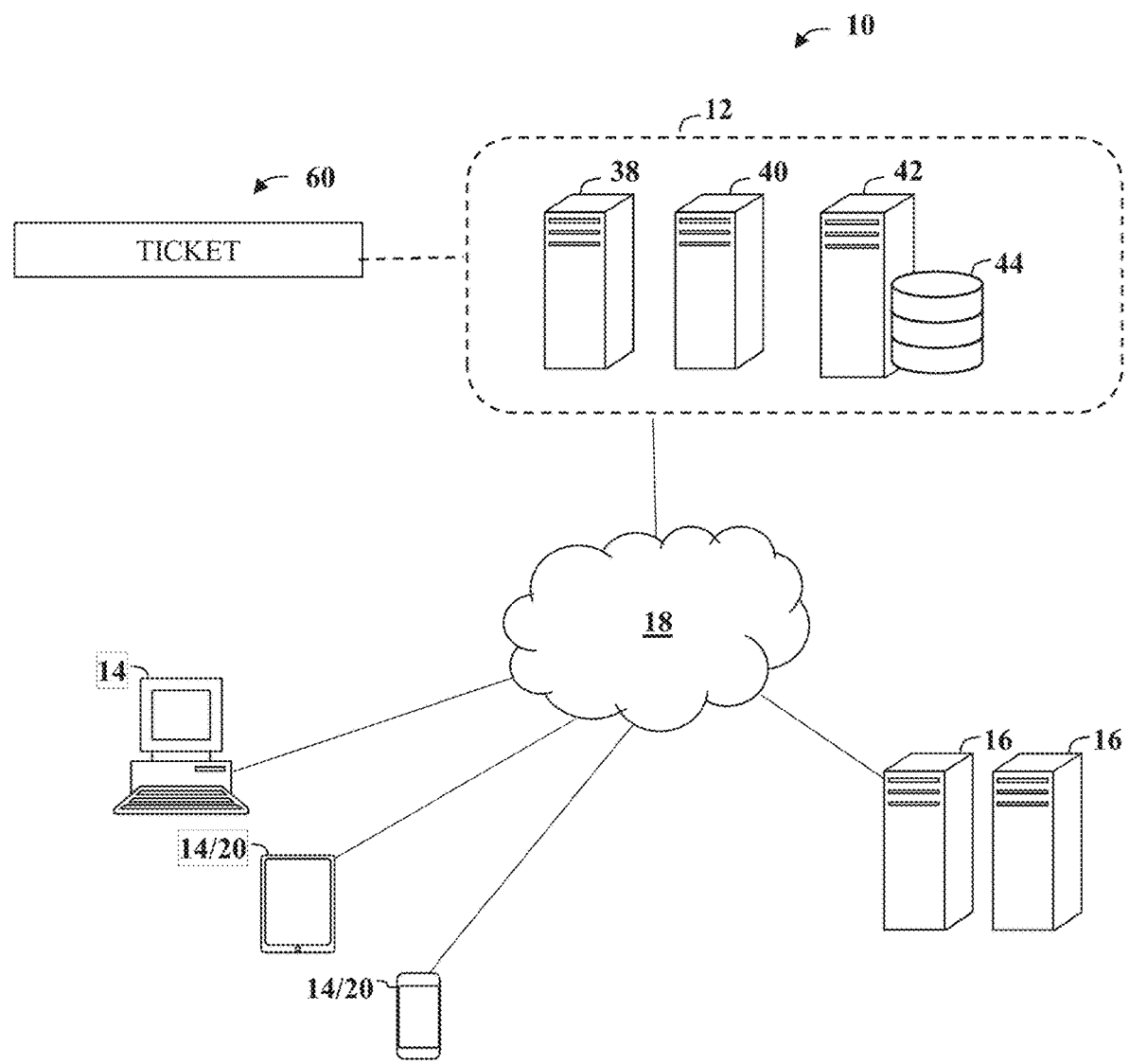
FIG. 1 is a schematic illustrating various aspects of a system, according to one embodiment of the present invention.

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible media of expression having computer-usable program code embodied in the media.

Any combination of one or more computer-usable or computer-readable media (or medium) may be utilized. For example, a computer-readable media may include one or more of a portable computer diskette, a hard disk, a random access memory (RAM) device, a read-only memory (ROM) device, a reasonable programmable read-only memory (CDROM), an optical storage device, and a magnetic storage device. Computer program code for carrying out operations of the present invention may be written in any combination of one or more programming languages.

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture including instruction means which implement the function/act specified in the flowchart and/or block diagram block or blocks.

Several (or different) elements discussed below, and/or claimed, are described as being "coupled", "in communication with", or "configured to be in communication with". This terminology is intended to be non-limiting, and where appropriate, be interpreted to include without limitation, wired and wireless communication using any one or a plurality of a suitable protocols, as well as communication methods that are constantly maintained, are made on a periodic basis, and/or made or initiated on an as needed basis. The term "coupled" means any suitable communications link, including but not limited to the Internet, a LAN, a cellular network, or any suitable communications link. The communications link may include one or more of a wired and wireless connection and may be always connected, connected on a periodic basis, and/or connected on an as needed basis.

In general, the present invention includes a system 10 such as a networked computer system that is configured to play an event-based game. The system 10 includes application software that enables the system 10 to play the game. In one embodiment, the event-based game is a fantasy football game. In this embodiment of the fantasy football game, the object of the game is for chosen participants (which come from a pool of NFL® players), to gain as many yards as possible, and score as many points as possible during a live NFL® football game. The participants come from five separate pools. Each pool contains participants who produce a majority of yards gained and points made during a live NFL® game. These pools are position based, and are known as skilled positions. In one embodiment, the skilled positions are #1: Quarterback, #2: Running back, #3: Receiver, #4: Tight End, and #5: Kicker. Every weekend there are at least twenty four participants at each skilled position. Each pool is broken down into two categories, Group "A", and Group "B". In one embodiment, Group "A" contains sixteen participants, and Group "B" contains eight participants. Group "A" consists of probable participants, and Group "B" consists of alternate participants. In the event one of the probable participants from Group "A" does not participate, an alternate participant from Group "B" will participate in its place. In one embodiment, these participants can change week to week, and each week a new set of participants are uploaded to the system 10. It should be appreciated that injuries and performance have a lot to do with which participants will be selected and, if a participant is listed as questionable, the participant will most likely end up in Group "B", as an alternate participant.

During the time wagering is closed (Sunday to Tuesday), either the system 10 or a game host determines which participants from the NFL® to be eligible, as well as which pool the participants will be assigned to. If the system 10 makes the determination, the information is uploaded automatically to the system 10. If the game host determines, the information is manually uploaded to the system 10. In one embodiment, a random number generator (RNG) of the system 10 then assigns one alternate participant from Group "B" to two probable participants from Group "A", until all eight alternate participants have been assigned. It should be appreciated that, in one embodiment, the fantasy football game does not include Thursday night football, thereby giving players playing the game, a couple more days to enter the event. It should also be appreciated that wagering for each upcoming weekend opens Tuesday at 10:00 AM Pacific Time, then, just prior to the start of the first NFL game Sunday morning, wagering closes.

The application software also enables a computing device having a processor to place a wager. Once wagering is open for the game, the game could be played using a live drawing, slot machine, kiosk, or on-line. When the player playing the game activates the wager, the following steps occur. The RNG selects one probable participant from Group "A" (which includes an alternate participant from Group "B"), for all five positions, in one embodiment, such as Quarterback, Running Back, Tight End, Receiver, and Kicker. The names of the selected participants are then printed on a ticket, and the ticket is dispensed to the player playing the game. It should be appreciated that other items such as payoffs, odds, and date and time of event can be printed on the ticket as well.

Now, the player playing the game has five selected participants on their ticket. The player wants all five of these selected participants to gain as many yards, and score as many points as possible. In one embodiment, every ten yards gained equates to one point, and every touchdown equates to six points. For example, one of selected participants on the ticket for the player gains 124 yards, and scores one touchdown. This equates to 12.4 points for yards gained, and six points for a touchdown. Total points for this player is 18.4 points. In one embodiment, kickers earn three points for made field goals, 3.5 points for made field goals over fifty yards, and one point for kicking an extra point after touchdown. For example, the selected participant for kicker makes two field goals, (One field goal is 54 yards), and two points after touchdowns, the total points from the selected kicker is 8.5 points. The last way to score points is a two point conversion after a touchdown is scored. In this example, if one of the selected participants on the ticket for the player throws, runs, or catches a successful two point conversion, the selected participant is rewarded two points.

The selected participants on the ticket of the player are competing against fifteen different participants, at their respective positions. The object of the game is for the selected participants on the ticket of the player to have the highest point total at each position. In the game for the system 10, the player is only competing against participants at each position. In other words quarterbacks only compete with quarterbacks, etc. To win the grand prize jackpot, the selected participants on the ticket of the player must have the highest point total at all five positions. The system 10 notifies the player who wins the grand prize jackpot. It should be appreciated that the system 10 may award prizes for winning four out of five positions, three out of five, and two out of five.

The application software may include a program version that includes a user version available in all the application stores and potentially pre-installed as a part of default carrier software loads (for example: AT&T, Sprint, Verizon, etc.) that will provide the functionality to be described below.

Referring to FIG. 1, in the illustrated embodiment, the system 10 includes a server system 12 that is coupled in communication with one or more user computing devices 14 and one or more $3^{rd}$ party computer servers 16 via a communications network 18. The server system 12 may be any suitable server, including an internet transaction server (ITS), an ATG application server or an ATG application instance, a Dynamo server, etc. . . . , and may utilize any suitable or combination of technologies configured to enable efficient communication. The communications network 18 may be any suitable connection, including the Internet, Voice Over IP (VoIP), file transfer protocol (FTP), an Intranet, LAN, a virtual private network (VPN), cellular networks, etc. . . . , and may utilize any suitable or combination of technologies including, but not limited to wired and wireless connections, always on connections, connections made periodically, and connections made as needed.

The user computing device 14 may include any suitable device that enables the user to access and communicate with the system 10 including sending and/or receiving information to and from the system 10 and displaying information received from the system 10 to the user. For example, in one embodiment, the user computing device 14 may include, but is not limited to, a game machine, a desktop computer, a laptop or notebook computer, a tablet computer, a smartphone/tablet computer hybrid, a personal data assistant, a handheld mobile device including a cellular telephone, and the like. The user computing device 14, as well as any other connected computer systems and their components included in the system 10, can create message related data and exchange message related data (e.g., near field communication ("NFC") payloads, Bluetooth packets, Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network 18.

In one embodiment, the user computing device 14 includes a mobile computing device 20 (shown in FIG. 2) such as, for example, a smartphone such as an iPhone™. The mobile computing device 20 includes a processor coupled to a memory device, and a database for storing various programs and data for use in operating the mobile computing device 20. The mobile computing device 20 may also include a touchscreen display device 22, one or more video image cameras 24, one or more speakers 26, a microphone 28, at least one input button 30, and one or more sensors including, but not limited to, a touch ID fingerprint sensor coupled to an input button 30, a barometer, a three-axis gyro, an accelerometer, proximity sensor, and an ambient light sensor. In addition, the mobile computing device 20 may also include a Wi-Fi antenna, a cellular network antenna, a Bluetooth™ communications device, assisted GPS and GLONASS, a digital compass, and an iBeacon microlocation device.

Figure 2:
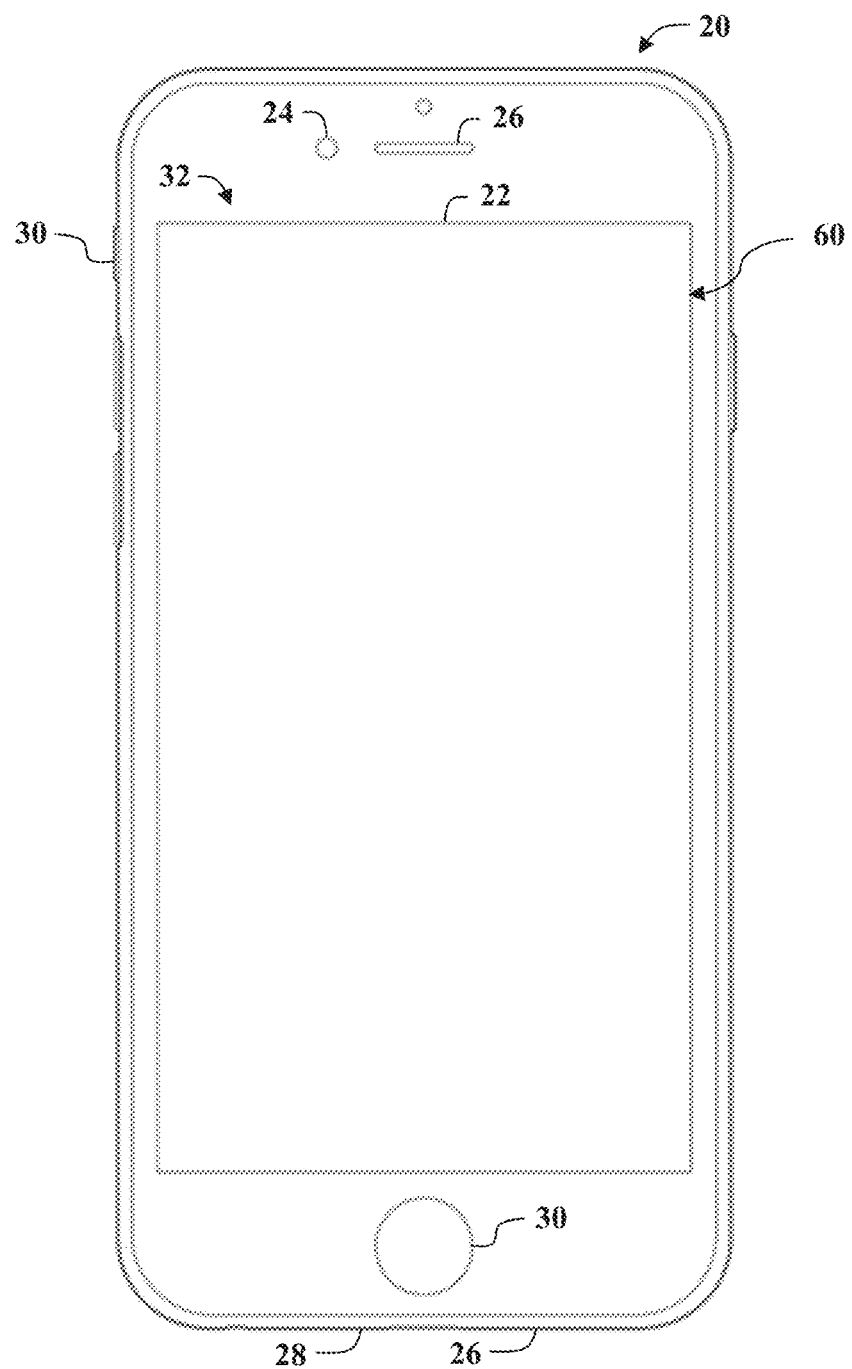
FIG. 2 is a plan view of a component of the system of FIG. 1.

In the illustrated embodiment of FIG. 2, the mobile computing device 20 includes a web browser programmed and stored in the memory device. The processor executes the web browser program to display web pages on the touchscreen display device 32 that includes information received from the server system 12 to enable the user to interact with and operate the server system 12. In addition, the mobile computing device 20 may be programmed to store and execute a mobile program application, e.g., a mobile application, that displays a user interface 32 on the touch screen display device 22 that allows the user to access the server system 12 to retrieve and store information within the server system 12 as well as interact with and operate the server system 12. In addition, in one embodiment, the system 10 may install one or more mobile application programs in the memory device of the mobile computing device 20. When initiated by the processor of the mobile computing device 20, the mobile application program causes the processor of the mobile computing device 20 to perform some or all of the functions of the server system 12.

The $3^{rd}$ party computer servers 16 may include information and data associated with the game such as statistical data on participants and game results. For example, in one embodiment, the $3^{rd}$ party computer servers 16 may include information for the website NFL®.com associated with NFL® player data and NFL® game results data.

In the illustrated embodiment of FIG. 1, the server system 12 includes one or more servers such as a website hosting server 38, a communication server 40, a database server 42, and a database 44. The database server 42 includes a memory device that is connected to the database 44 to retrieve and store information contained in the database 44. The database 44 is a storage medium that contains information on a variety of matters, such as, for example, web pages, a plurality of records on statistical data on participants and game results, player satisfaction data, sales data, usage data, outcome data, notification messages, mobile device identifiers, mobile device application program interfaces (APIs), and/or any suitable information that enables the system 10 to function as described herein. In one embodiment, some or all of the information contained in the database 44 may also be stored in the database of the mobile computing device 20.

The website hosting server 38 is configured to host a website that is accessible by the user via one or more user computing devices 14. The website hosting server 38 retrieves and stores web pages to allow users to interact with the website and send data and receive reports. In one embodiment, the website hosting server 38 is configured to generate and display data, reports, and messages on the user computing device 14. In addition, the website hosting server 38 may be configured to generate and display a mobile web page, the mobile web page can be displayed on one or more mobile computing devices 20. For example, in one embodiment, the website hosting server 38 may display a ticket 60 as illustrated in FIG. 1.

In the illustrated embodiment, the communications server 40 is programmed to receive various data and information from the website hosting server 38 and the database server 42 and to send data and information to the user computing device 14 via the communications network 18 to enable the user to access and interact with the system 10. In one embodiment, the communications server 40 displays various images on a graphical interface of the user computing device 14 preferably by using computer graphics and image data stored in the database 44 including, but not limited to, statistical data on participants and game results, dashboards, reports, messages, and/or any suitable information and/or images that enable the system 10 to function as described herein.

In the illustrated embodiment, the database server 42 is programmed to access the database 44. For example, the database server 42 is programmed to receive various data and information from the communications server 40 and to store this information in the database 44. For example, the data stored in the database 44 may include statistical data on participants and game results, dashboards, reports, messages, usage data, consumption data, outcome data, player satisfaction data, and/or any suitable information and/or images. It should be appreciated that player satisfaction data ties to usage, consumption, and outcome data in the database 44.

Figure 3:
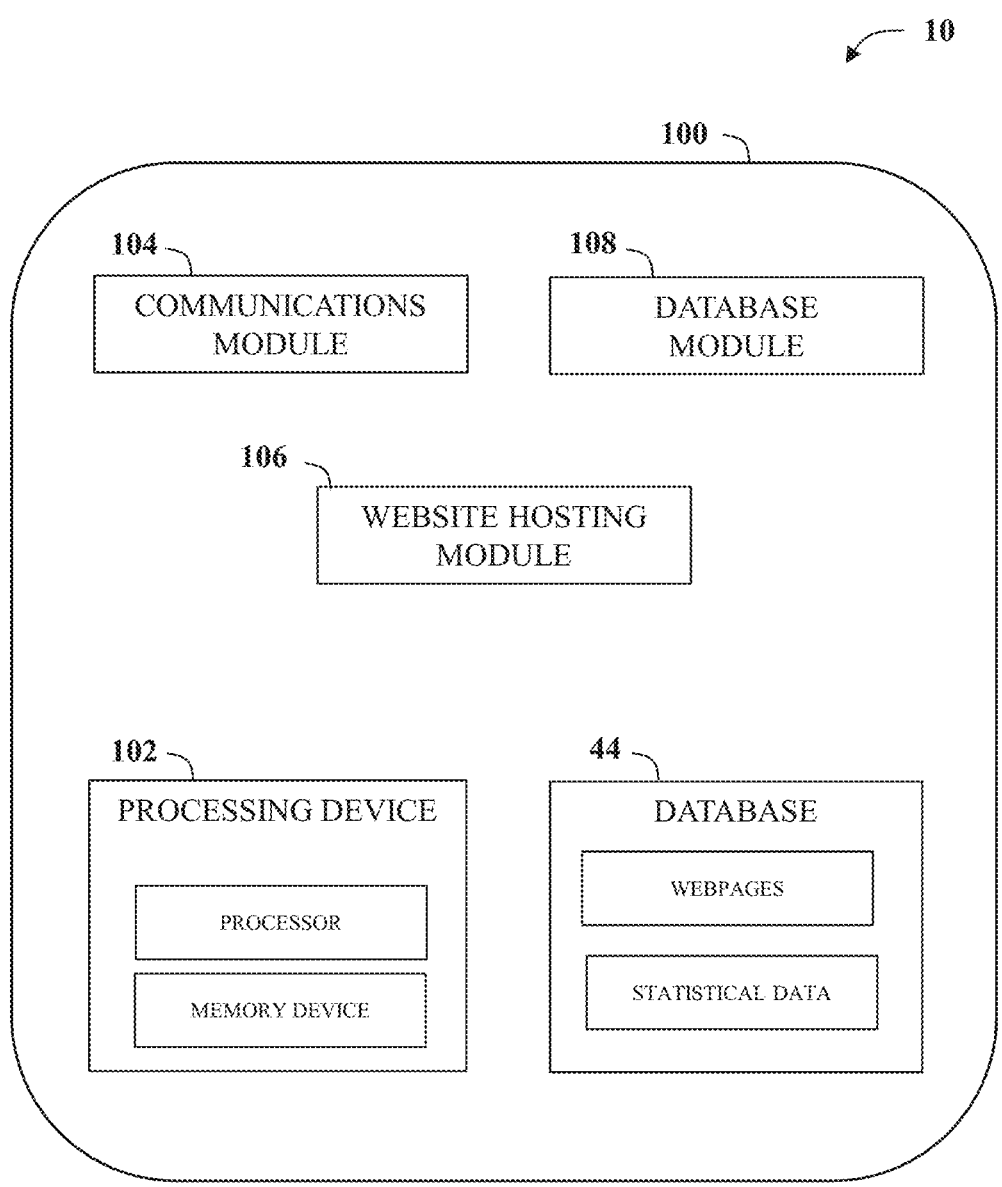
FIG. 3 is a schematic illustrating example components of a computer server used with the system shown in FIG. 1.

Referring to FIG. 3, in one embodiment, the system 10 may include a system server 100 that is configured to perform the functions of the website hosting server 38, the communications server 40, and the database server 42. In the illustrated embodiment, the system server 100 includes a processing device 102 and the database 44.

The processing device 102 executes various programs, and thereby controls components of the system server 100 according to user instructions received from the user computing device 14. The processing device 102 may include memory, e.g., read only memory (ROM) and random access memory (RAM), storing processor-executable instructions and one or more processors that execute the processor-executable instructions. In embodiments where the processing device 102 includes two or more processors, the processors can operate in a parallel or distributed manner. In an example, the processing device 102 may execute a communications module 104, a website hosting module 106, and a database module 108.

The processing device 102 may also include a storage medium or memory device for storing programs and information in the database 44, and retrieving information from the database 44 that is used by the processor to perform various functions described herein. The memory device may include, but is not limited to, a hard disc drive, an optical disc drive, and/or a flash memory drive. Further, the memory device may be distributed and located at multiple locations.

The communications module 104 may be programmed to perform some or all of the functions of the communications server 40 including retrieving various data and information from the database module 108 and sending information to the user computing device 14 via the communications network 18 to enable the user to access and interact with the system 10. In one embodiment, the communications module 104 displays various images on a graphical interface of the user computing device 14 preferably by using computer graphics and image data stored in the database 44 including, but not limited to, statistical data on participants and game results, dashboards, reports, messages, and/or any suitable information and/or images that enable the system 10 to function as described herein.

The website hosting module 106 may be programmed to perform some or all of the functions of the website hosting server 34 including hosting various web pages that are stored in the database 44 and that are accessible to the user via the user computing device 14. The website hosting module 106 may be programmed to generate and display webpages associated with the web site.

The database module 108 may be programmed to perform some or all of the functions of the database server 42 including storing information in the database 44 and retrieving information stored in the database 44. The database module 108 may be programmed to generate a ticket 60 associated with the stored data.

Figure 13:
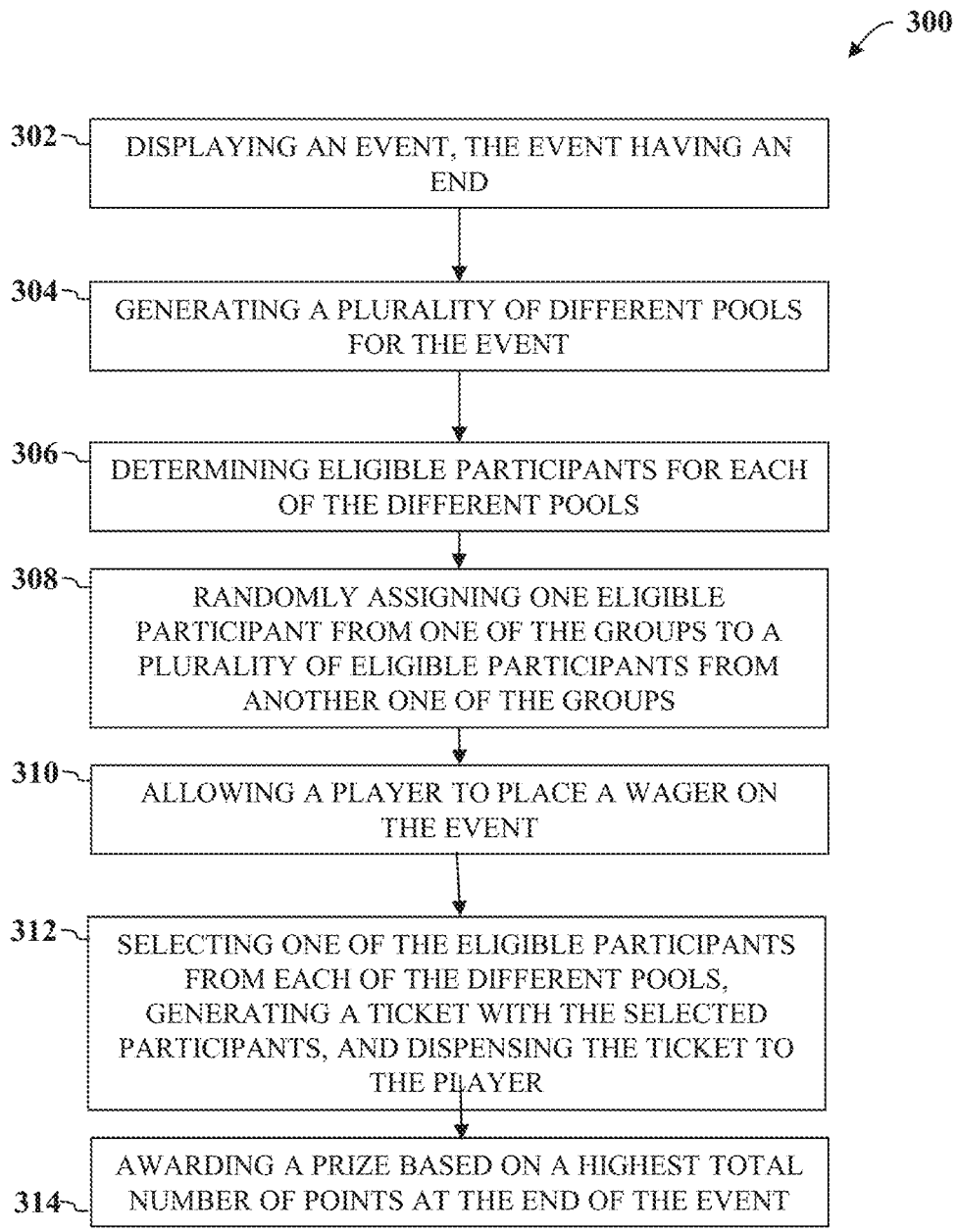
FIG. 13 is a flowchart of a method, according to one embodiment of the present invention, used with the system shown in FIG. 1.

Referring to FIG. 13, a flowchart of one embodiment of a method 300, according to the present invention, that may be used with the system 10 for providing an event-based game to a plurality of players. The method 300 includes a plurality of steps. Each method step may be performed independently of, or in combination with, other method steps. Portions of the method may be performed by any one of, or any combination of, the components of the system 10.

In method step 302, the method 300 includes the step of displaying an event on a display device, the event having an end. For example, the user computing device 14 displays on the display device 22 an event such as a fantasy football game where the object of the game is for the selected participants (which come from a pool of NFL® players) on a ticket, to gain as many yards as possible, and score as many points as possible during a live NFL® football game. In one embodiment, the system 10 may host the game and communicate the game to the user computing device 14. It should be appreciated that the term "end" means that, in one embodiment, the week of football has an ending.

Figure 4:
FIG. 4 is a schematic illustrating an exemplary first pool used with the system of FIG. 1.
Figure 8:
FIG. 8 is a schematic illustrating an exemplary fifth pool used with the system of FIG. 1.

In method step 304, the method 300 includes the step of generating, by a processor, a plurality of different pools for the event, wherein each of the different pools includes a plurality of groups and each of the groups includes a plurality of participants. In one embodiment, the processing device 102 generates the plurality of different pools 50 for the fantasy football game. For example, participants come from five separate and different pools 50. Each pool 50 contains participants, such as from the NFL®, who produce a majority of yards gained and points made during a live NFL® game. These pools 50 are position based and are known as skilled positions. In one embodiment, the skilled positions used for the fantasy football game, are #1: Quarterback, #2: Running back, #3: Receiver, #4: Tight End, and #5: Kicker as illustrated in FIGS. 4-8. As illustrated in FIG. 4, a first or quarterback pool 50 may include a Group "A" of probable quarterback participants and a Group "B" of alternate quarterback participants. As illustrated in FIG. 5, a second or running back pool 50 may include a Group "A" of probable running back participants and a Group "B" of alternate running back participants. As illustrated in FIG. 6, a third or wide receiver pool 50 may include a Group "A" of probable wide receiver participants and a Group "B" of alternate wide receiver participants. As illustrated in FIG. 7, a fourth or tight end pool 50 may include a Group "A" of probable tight end participants and a Group "B" of alternate tight end participants. As illustrated in FIG. 8, a first or kicker pool 50 may include a Group "A" of probable kicker participants and a Group "B" of alternate kicker participants. It should be appreciated that the number of different pools 50 and the sizes of the pools 50 may vary depending on the event-based game.

Returning to FIG. 13, in method step 306, the method 300 includes the step of determining eligible participants for each of the different pools. In one embodiment, the processing device 102 determines eligible participants for each of the different pools 50. For example, every weekend there are at least twenty four participants at each position. Each pool 50 is broken down or subdivided into two categories, Group "A", and Group "B". In one embodiment, Group "A" contains sixteen participants and Group "B" contains eight participants. Group "A" consists of probable participants, and Group "B" consists of alternate participants. In the event one of the probable participants from Group "A" does not participate, for example due to injury, an alternate participant from Group "B" will participate in its place. In another embodiment, the step of determining eligible participants may be performed manually such as by a person, for example, game host. In one embodiment, these participants can change week to week, and each week a new set of participants are uploaded to the system 10 either manually or automatically. It should be appreciated that injuries and performance have a lot to do with which participants will be determined eligible and this information may be provided to the system 10 from the third party server 16. It should also be appreciated that, if a participant is listed as questionable, the participant will most likely end up in the Group "B", as an alternate participant. It should further be appreciated that, in one embodiment, the game does not include Thursday night football, thereby giving players playing the fantasy football game, a couple more days to enter the event. It should still further be appreciated that, in one embodiment, wagering for each upcoming weekend opens Tuesday at 10:00 AM Pacific Time, then, just prior to the start of the first NFL game Sunday morning, wagering closes.

Further, in method step 308, the method 300 includes the step of randomly assigning, by a random number generator (RNG), one eligible participant of the plurality of participants from one of the groups to a plurality of eligible participants of the plurality of participants from another one of the groups. In one embodiment, the processing device 102 includes the RNG for randomly assigning one eligible participant from one of the groups to a plurality of eligible participants from another one of the groups. For example, during the time wagering is closed (Sunday to Tuesday), the processor 102 may determine which participants are eligible to play as well as which pool 50 the participants will be assigned to. For example, participants that are on an injury list may not be eligible or participants that have a poor performance from the prior week may not be eligible. This information is upload onto the system 10 either automatically or manually by inputting the information into the system 10. Once the information is in the system 10, in one embodiment, the RNG then assigns one eligible alternate participant from Group "B" to two eligible probable participants from Group "A", until all eight eligible alternate participants have been assigned. It should be appreciated that, in another embodiment, the RNG may be replaced and the eligible participants assigned manually by the game host.

In method step 310, the method 300 includes the step of allowing, by a computing device, a player to place a wager on the event. For example, once wagering is open as determined by the processing device 102, the game could be played using a live drawing or the user computing device 14 such as a game machine, slot machine, kiosk, or on line and communicated to and from the user computing device 14 over the network 18. In one embodiment, the player places a wager, for example five dollars, on the event for a particular week.

In method step 312, the method 300 includes the step of selecting, by the processor, one of the eligible participants from each of the different pools, printing a ticket with the selected participants, and dispensing the ticket to the player. In one embodiment, after a wager is placed by a player, the processing device 102 selects one of the eligible participants from each of the different pools 50, generates a ticket 60 with the selected participants, and dispenses the ticket 60 to the player. For example, when the player playing the game activates the wager, the following steps occur in one embodiment. The RNG of the processing device 102 selects one eligible probable participant from Group "A" (which includes an eligible alternate participant from Group "B"), for all five positions, Quarterback, Running Back, Tight End, Receiver, and Kicker. The names of the selected participants are then generated, displayed or printed on the ticket 60, and the ticket 60 is communicated or dispensed to the player playing the game. As illustrated in FIG. 9, a first sample ticket 60—Exhibit A is illustrated with the names of the starters or probable participants and the back-up or alternate participants along with the amount of the wager and week of the game. As illustrated in FIG. 11, a second sample ticket 60—Exhibit B is illustrated with the names of the starters or probable participants and the back-up or alternate participants along with the amount of the wager and week of the game. It should be appreciated that the names of the participants for the first sample ticket 60 and the second sample ticket 60 may be different or the same. It should also be appreciated that, in one embodiment, the ticket 60 may be an electronic ticket 60 generated by the processing device 102 and communicated to the user computing device 14 such as the mobile phone device 20 of the player and displayed on the display device 22. It should further be appreciated that, in another embodiment, a physical ticket 60 is printed and dispensed by a kiosk or game machine. It should still further be appreciated that other items such as payoffs, odds, and date and time of event can be displayed or printed on the ticket 60 as well.

When the player playing the game sees who their participants are at each position, the player has only one chance to change one player at one position, for an additional wager, for example five dollars ($5.00). For example, the player does not like their participant at quarterback on their ticket 60. The player can pay $5.00, select "Change Quarterback", and the RNG will select another quarterback from the pool 50. The player still does not know which participant at quarterback he/she will receive, but the new or second participant will be different than the first participant. It should be appreciated that if the player does not like the second participant, the player would have to purchase another ticket 60. It should further be appreciated that the player only gets one chance at one position and the player cannot change more than one position on one ticket (i.e., one time only, one position only).

In method step 314, the method 300 includes the step of awarding a prize based on a highest total number of points at the end of the event, wherein the processor informs the player whether the player holds the highest total number of points for the event. In one embodiment, the processing device 102 awards a prize based on a highest total number of points at the end of the event for the week and informs the player whether the player holds the highest total number of points for the event. For example, the person playing the game has five selected participants on their ticket 60. The player wants all five of these selected participants to gain as many yards and score as many points as possible. In one embodiment, every ten yards gained equates to one point, and every touchdown equates to six points. For example, one of selected participants on the ticket 60 for the player gains 124 yards and scores one touchdown. This equates to 12.4 points for yards gained, and six points for a touchdown. Total points for this player is 18.4 points. In one embodiment, kickers earn three points for made field goals, 3.5 points for made field goals over fifty yards, and one point for kicking an extra point after touchdown. For example, the selected participant for kicker makes two field goals, (One field goal is 54 yards), and two points after touchdowns. The total points from the selected kicker is 8.5 points. The last way to score points is a two point conversion after a touchdown is scored. In this example, if one of the selected participants on the ticket 60 for the player throws, runs, or catches a successful two point conversion, the selected participant is rewarded two points.

The selected participants on the ticket 60 of the player are competing against fifteen different participants, at their respective positions. The object of the game is for the selected participants on the ticket 60 of the player to have the highest point total at each position. In the game for the system 10, the player is only competing against participants at each position. In other words, quarterbacks only compete with quarterbacks, etc. To win the grand prize jackpot, the selected participants on the ticket 60 of the player must have the highest point total at all five positions. The system 10 notifies the player who wins the grand prize jackpot. In addition, the system 10 may generate or communicate the results for the end of the event to the player. For example, the processing device 102 may generate the results 70 for the end of the event for one week as illustrated in FIG. 10 corresponding to the first sample ticket of FIG. 9 and for another week as illustrated in FIG. 12 corresponding to the second sample ticket of FIG. 11. It should be appreciated that the system 10 may award prizes for winning four out of five positions, three out of five, and two out of five. It should also be appreciated that the system 10 may notify the player when a selected participant scores, other players scores, current score against other players, or where the player is in the standings of the game. It should be appreciated that the system 10 may notify the user computing device 14 of the player by text messaging, e-mail, etc.

In another embodiment of the method 300, according to the present invention, for providing an event-based game to a plurality of players, a lucky seven pro football weekly scoring contest is conducted using the system 10. In one embodiment, to play the game, a player chooses predetermined numbers such as any seven numbers (7), one through thirty (1-30), with the user computing device 14, or the processing device 102 can let a "quick pick" select the numbers for the player. In one embodiment, the cost of the game is five dollars, and can be played at the Casino or on the Internet using the system 10. In this embodiment, there are thirty two (32) NFL® teams. Due to Thursday night football, in one embodiment, only the thirty (30) teams that play on Sunday and Monday are included (this gives players almost an entire week to play). In one embodiment, after a drawing, all of the chosen numbers will have seven different teams assigned to the ticket 60 of the player. It should be appreciated that the object of the game is for the player's team to score as many points as possible, and (most importantly) having the highest point total. It should further be appreciated that the highest point total on the ticket 60 will result in a winner and notified by the system 10. It should still further be appreciated that a player's cash prize increases at the player's point total increases and an example of the cash prizes are shown in FIG. 14.

In one step of the method, players simply choose a predetermined amount of numbers such as five numbers from one to thirty (1-30). Then (prior to the start of the games) wagering closes, the RNG licensed in a particular state, such as New Jersey, randomly assigns thirty different numbers to the thirty teams participating in that weekend's games. The method lists the teams in alphabetical order. In the method 300, the player's five chosen numbers have been assigned teams and the method generates a ticket 60 for the player with the system 10.

The object of the game is for the player's five teams to score as many points as possible. Once the games are completed, the point total of all five of the player's teams are added up and, if the point total is within the top ten point totals of all of the players participating in the event, the player wins. It should be appreciated that it does not matter if the player's teams win or lose the game, but how many points the player scored.

In one embodiment, the cost to play the game is five dollars and the game may be played through a casino's website. In another embodiment, there is a pari mutual wagering such that after the house take, the reset of the money is distributed to the players of the game.

A controller, computing device, server or computer, such as described herein, includes at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, the database 44, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DBXX, Microsoft® SQL Server, Sybase®, and PostgreSQL. However, any database 44 may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California)

The present invention has been described in an illustrative manner. The above description of illustrated examples of the present invention, including what is described in the Abstract, are not intended to be exhaustive or to be limitation to the precise forms disclosed. While specific embodiments of, and examples for, the present invention are described herein for illustrative purposes, various equivalent modifications are possible without departing from the broader spirit and scope of the present invention.

What is claimed is:

1. A system for generating and managing game information for use in presenting a wagering game based upon a plurality of live football games to a plurality of players, comprising:
   a system server comprising a processor, a memory, a communication interface, and machine-readable code stored in said memory and executable by said processor to cause said processor to:
      receive and store information regarding a set of participants associated with teams playing said live football games;
      generate, using said information regarding said set of participants, a plurality of different pools for the wagering game, wherein each of the different pools comprise a first group and a second group, each first group comprising a first set of participants from said set of participants, each of said participants in said first set of participants associated with a team from a first set of said teams playing said live football games, and each second group comprising a second set of participants from said set of participants, each of said participants in said second set of participants associated with a team from a second set of said teams playing said live football games, wherein the teams in said second set of teams are different from said teams in said first set of teams;
      implement a random number generator;
      create a plurality of game tickets, each game ticket comprising the random selection, via an output of said random number generator, and assignment of one participant from said first group and one participant from said second group of each of said different pools for said wagering game, whereby said plurality of game tickets define a permutation of game tickets having unique sets of participants;
      store a data record of each created game ticket and the selected participants for each of said different pools for said game ticket;
      assign, in response to each wager placed by said each player of said plurality of players, one of said game tickets to said player;
      transmit information regarding each assigned game ticket to said player, said information regarding said game ticket comprising information regarding said one participant from said first group and said one participant from said second group for each of said pools;

receive, via said communication interface from at least one remote source of game play information, game play information regarding said play of said live football games after assignment of said game ticket to said player;

automatically determine a score for each of said participants associated with said pools based upon said game play information regarding said play of said live football games;

determine whether each of said assigned tickets is winning as to each pool, comprising determining whether the selected participant from said first group, or when the participant from the first group was declared inactive, the selected participant from the second group, had the highest score for said pool; and declaring a winning or losing outcome as to each assigned ticket based upon said determination of whether said player's ticket is winning as to at least one of said pools and updating said data record of each game ticket to reflect said ticket as winning or losing.

2. The system in accordance with claim 1, wherein each of said pools relates to a designated position of participants in said football games.

3. The system in accordance with claim 2, wherein said positions comprise: quarterback, running back, receiver, tight end and kicker.

4. The system in accordance with claim 1, wherein a number of participants in said first and second groups of each pool is less than a number of teams participating in said football games.

5. The system in accordance with claim 1, wherein said information regarding said game ticket comprises an image of a game ticket bearing the names of selected participants.

6. The system in accordance with claim 1, wherein said machine-readable code stored in said memory and executable by said processor is further configured to cause said processor to determine a number of participants for each pool, determine probable participants from said number of participants and assign said probable participants to said first group.

7. The system in accordance with claim 1, wherein a number of participants in said first group is greater than a number of participants in said second group.

8. The system in accordance with claim 1, wherein said determined score for each participant comprises a numeric value.

9. The system in accordance with claim 1, comprising declaring a first winning outcome as to said player's ticket when said player's ticket is winning as to at least one pool and declaring a second winning outcome as to said player's ticket when said player's ticket is winning as to all of said pools.

10. The system in accordance with claim 1, wherein said machine-readable code stored in said memory and executable by said processor is further configured to cause said processor to select a replacement participant from a first group of one of said pools in response to a player's secondary replacement wager and updating said player's ticket with said selected replacement participant.

11. The system in accordance with claim 1, wherein said machine-readable code stored in said memory and executable by said processor is further configured to cause said processor to, in response to game play information indicating one of said participants in said first pool did not play, declare said participant in said first group of a pool inactive and determine an outcome of each ticket including said participant based upon an identified participant from said second group.

12. The system in accordance with claim 1, wherein said step of transmitting information regarding said game ticket to said player comprises causing a printer to print said ticket.

13. The system in accordance with claim 1, further comprising a database, said database storing information regarding said player's ticket.

14. The system in accordance with claim 1, wherein said system server is configured as a webserver for receiving inputs from a player's mobile communication device and to transmit information to said player's mobile communication device.

15. The system in accordance with claim 14, wherein said live events comprise a plurality of live sporting events.

16. The system in accordance with claim 14, further comprising selecting a replacement participant from a first group of one of said pools in response to a player's secondary replacement wager and updating said player's ticket with said selected replacement participant.

17. The system in accordance with claim 14, wherein said information regarding said game ticket comprises an image of a game ticket bearing the names of selected participants.

18. A system for generating and managing game information for use in presenting a wagering game based upon a plurality of live events to a plurality of players, comprising:

a database;

a system server comprising a processor, a memory, a communication interface, and machine-readable code stored in said memory and executable by said processor to cause said processor to:

generate a plurality of different pools for the wagering game, each pool having a first group and a second group;

determine a number of eligible participants for each pool, the number of eligible participants being less than a total number of participants that may participate in said live events;

determine probable participants from said number of eligible participants and assign said probable participants to said first group and assign one or more remaining eligible participants to said second group, the number of participants in each first group being greater than the number of participants in said second group;

store, in said database, information regarding said participants assigned to each of said first and second groups of each pool;

implement a random number generator;

create a plurality of game tickets, each game ticket comprising the random selection, via an output of the random number generator, of one participant from said first group and one participant from said second group of each of said different pools for said wagering game, whereby said plurality of game tickets represent different permutations of said participants from said first and second groups;

store a data record of each created game ticket and the selected participants for each of said different pools for said game ticket in said database;

assign, in response to each wager placed by each player of said plurality of players, one of said game tickets to said player;

generate and transmit image information regarding said game ticket to said player to cause a video display of a computing device of said player to display an image of said ticket, said information regarding said game ticket comprising information regarding said one participant from said first group and said one participant from said second group for each of said pools;

receive, via said communication interface from a remote server which provides game play information regarding said live events, event outcome information regarding a performance of said live events after assignment of said game ticket to said player;

automatically determine a score for each of said participants associated with said pools based upon said game play information regarding said live events;

determine whether each of said assigned tickets is winning as to each pool, comprising determining whether the selected participant from said first group, or when the participant from the first group was declared inactive, the selected participant from the second group, had the highest score for said pool; and declaring a winning or losing outcome as to each assigned ticket based upon said determination of whether said player's ticket is winning as to at least one of said pools and updating said data record of each game ticket to reflect said ticket as winning or losing.

* * * * *